(12) United States Patent
Hiraguchi

(10) Patent No.: US 6,978,958 B2
(45) Date of Patent: Dec. 27, 2005

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 161 days.

(21) Appl. No.: 10/355,229

(22) Filed: Jan. 31, 2003

(65) Prior Publication Data

US 2003/0146328 A1    Aug. 7, 2003

(30) Foreign Application Priority Data

Feb. 1, 2002    (JP)    ............................... 2002-025808

(51) Int. Cl.⁷ ............................................. G11B 23/04
(52) U.S. Cl. .................. 242/338.4; 242/345; 242/347; 242/348; 242/348.2
(58) Field of Search ............................ 242/338.4, 345, 242/345.2, 347, 348, 348.2

(56) References Cited

U.S. PATENT DOCUMENTS 3,980,255 A * 9/1976 Serizawa ................. 242/347.1
4,889,296 A * 12/1989 Watanabe et al. ........... 242/338
5,377,928 A * 1/1995 Gelardi et al. ............... 242/347
5,702,062 A * 12/1997 Kaku et al. ............... 242/338.4
5,734,540 A 3/1998 Jacobs et al.
5,927,632 A * 7/1999 Kaku et al. ............... 242/338.4
6,224,007 B1 * 5/2001 Kaku et al. ............... 242/338.4

* cited by examiner

Primary Examiner—Kathy Matecki
Assistant Examiner—Sang Kim
(74) Attorney, Agent, or Firm—Sughrue Mion, PLLC

(57) ABSTRACT

Structure of a lower case that reinforces a recording tape cartridge. At an inner side of the lower case, an annular projecting portion is provided along and at an inner side of a reel area rib that demarcates a reel area, raising stiffness of the case. At a periphery of a hole for positioning, which is formed in an outer face of the lower case, a recessed surface, which provides a height direction reference surface, is formed. At the inner side of the lower case, a boss is formed in correspondence to the hole for positioning. The boss is located along an outer face of the reel area rib. A thickness-enhancing portion is formed at the periphery of a base portion of the boss. Thus, thickness at the reference surface, that is, the recessed surface, is substantially the same as thickness at portions therearound.

20 Claims, 6 Drawing Sheets

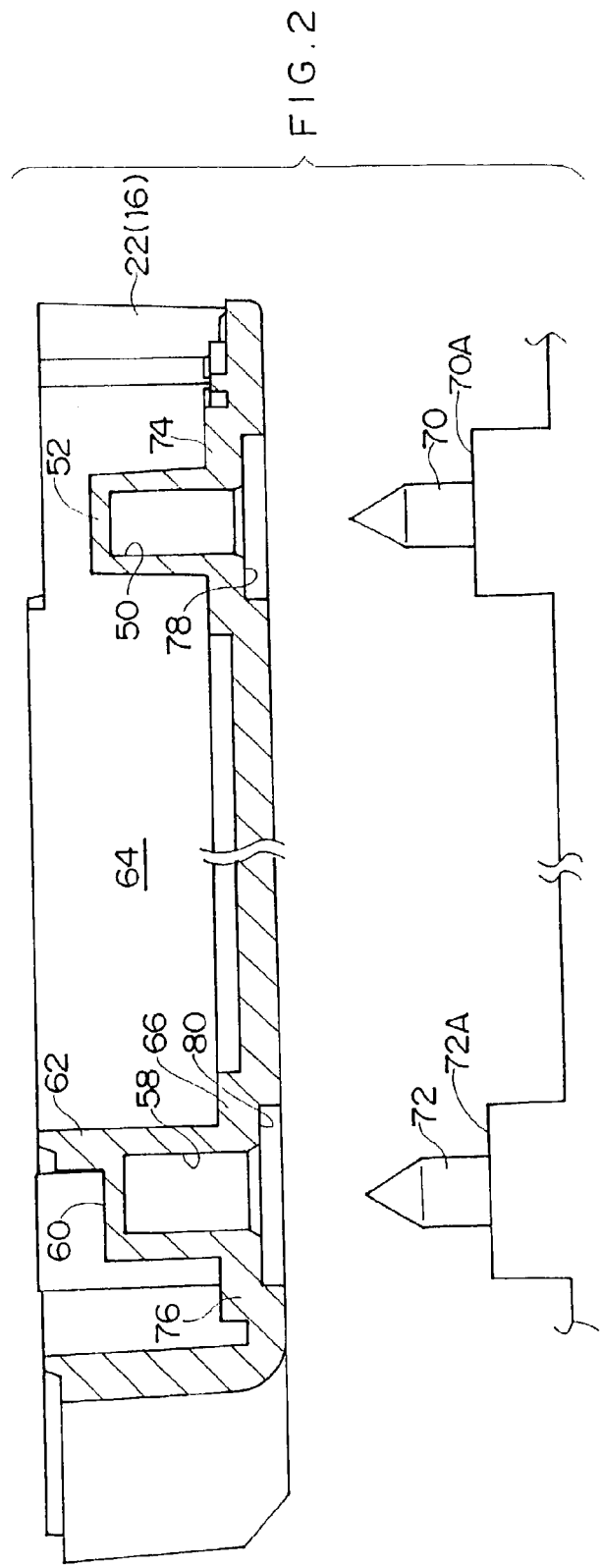

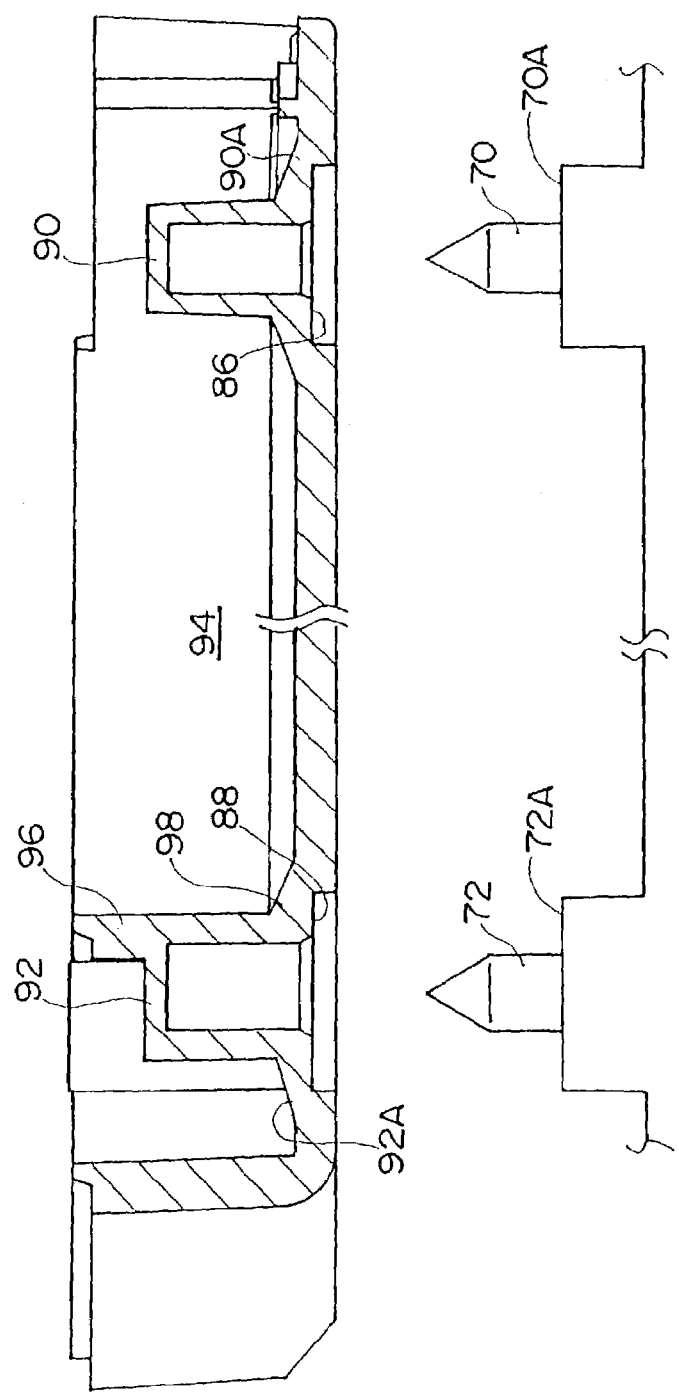

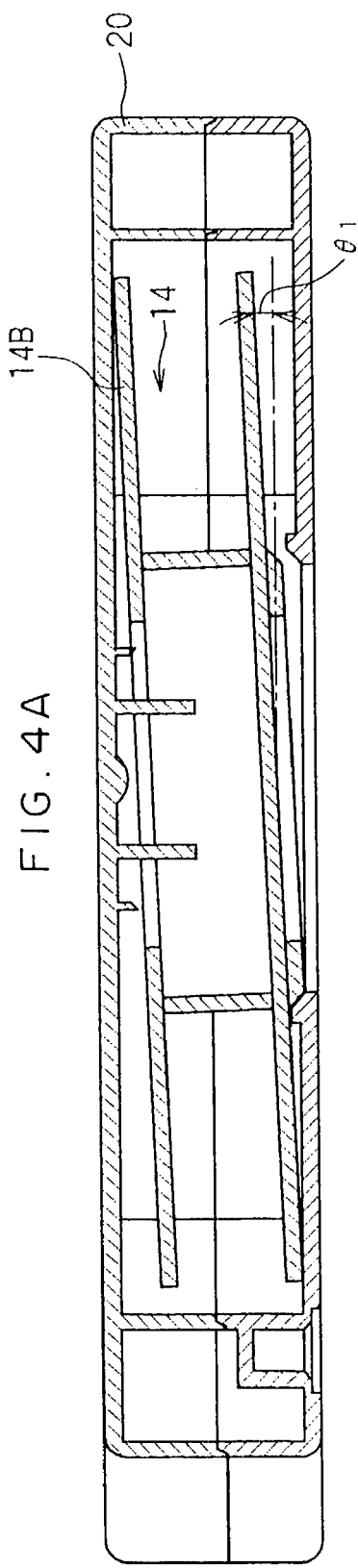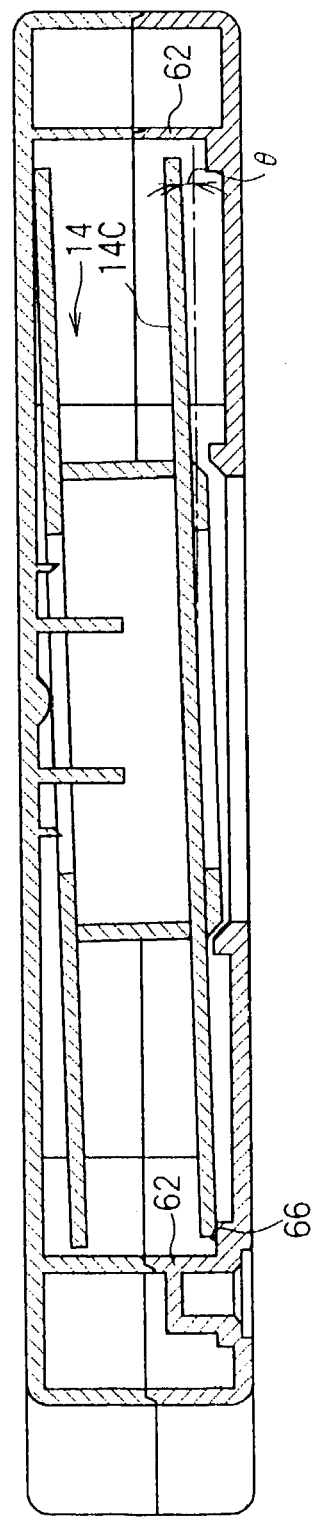
FIG. 4A
FIG. 4B

RECORDING TAPE CARTRIDGE

BACKGROUND OF THE INVENTION

1. Field of the Invention

The present invention relates to a recording tape cartridge which accommodates a reel on which a recording tape such as a magnetic tape or the like is wound, the recording tape cartridge being loaded at a drive device when in use.

2. Description of the Related Art

Recording tapes such as magnetic tapes and the like are used as recording media for saving data (information) for computers and the like, and for audio use, video use and the like. In order to prevent damage to a recording surface of such a recording tape, due to adherence of dust or the like to the recording surface, finger contact or the like, such a recording tape is employed in a recording tape cartridge. In this recording cartridge, the recording tape is wound onto a reel and the reel is rotatably accommodated in a case formed of resin.

"Single reel cartridges", in which a recording tape wound onto a single reel is accommodated in a case (these are principally used for back-up of information for computers and the like), two-reel cartridges, which are provided with two reels for winding and unwinding (for example, audio cassettes, video cassettes and the like), and the like are known as recording tape cartridges. When information is to be recorded or replayed with one of these recording tape cartridges, the recording tape cartridge is loaded at a drive device (a recording/replaying device).

In a state in which the recording tape cartridge has been loaded into the drive device and the case has been positioned in the drive device, the recording tape is drawn out of the case. This recording tape is guided along a predetermined tape path and brought close to a recording/replaying head of the drive device. Hence, information is recorded onto the recording tape and/or information that has been recorded on the recording tape is replayed.

Here, as shown in FIGS. 5 and 6, substantially circular arc-shaped reel area ribs 202 are standingly provided in a case 200 (an upper case is omitted from these drawings). The reel area ribs 202 bound a reel area 204 which accommodates a reel (not shown). The reel is urged downward by a spring (not shown). Accordingly, in order to increase rigidity of the case 200 in accordance with pressing force of the spring, the case 200 is made slightly thicker at the reel area 204.

Reference holes 208 and 210 are recessedly provided at two locations in an outer face of a lower case 206, which locations are obverse to a region at an outer side of the reel area 204 (and correspond to inner portions of bosses 205 and 207, which are projectingly provided at an inner face side of the lower case 206). By the reference holes 208 and 210 being insertingly fitted onto pins 214 disposed in a drive device 212, positioning of the case 200 in horizontal directions with respect to a drive device 212 is achieved.

Reference surfaces 208A and 210A, which are recessed from the outer face of the lower case 206, are provided at entry aperture portions of the reference holes 208 and 210, respectively. When the reference holes 208 and 210 are insertingly fitted onto the pins 214, the reference surfaces 208A and 210A abut against pedestal seats 214A provided at the pins 214, and thus positioning of the case 200 in a height direction with respect to the drive device is achieved.

Because the reference surfaces 208A and 210A are recessedly provided in the lower case 206, plate thickness at the reference surfaces 208A and 210A is thinner than at other portions of the lower case 206, such as, for example, portions that form regions peripheral to the reference surfaces 208A and 210A.

As a result, differences in plate thickness between the reference surfaces 208A and 210A and the peripheries of the reference surfaces 208A and 210A are large. As a result, sinking after forming, and flow lines and the like can occur. Moreover, mold transcription is variable, and texture, brightness and the like are irregular, which has an adverse effect on the appearance of the cartridge.

SUMMARY OF THE INVENTION

In consideration of the circumstances described above, an object of the present invention is to assure strength of a reel area of a recording tape cartridge. In addition, an object of the present invention is to provide a recording tape cartridge in which, when the recording tape cartridge is molded, deleterious effects of sinking and the like on external appearance do not occur.

A first aspect of the present invention provides a recording tape cartridge which accommodates a recording tape and is loaded at a drive device for use, the recording tape cartridge comprising: a reel at which the recording tape is wound; and a case which includes an inner face on which the reel is disposed, the case accommodating the reel, wherein the case includes: a rib which protrudes on the inner face and bounds a region accommodating the reel, and an annular protruding surface formed on the inner face, which surface is adjacent to and located at an inner side of the rib.

A second aspect of the present invention provides a recording tape cartridge which accommodates a recording tape and is loaded at a drive device for use, the recording tape cartridge including: a reel at which the recording tape is wound; and a case which includes an inner face on which the reel is disposed, the case accommodating the reel, wherein the case includes: an outer face obverse to the inner face; a recessed surface at the outer face for providing a reference surface for a height direction of the recording tape cartridge; and a protruding surface formed at the inner face for a region corresponding to at least the recessed surface.

In a recording tape cartridge of the aspects described above, ribs which define the region accommodating the reel are provided protruding up from the inner face of the case, and holes for positioning are formed in the outer face in correspondence with a region outward from the ribs. Recessed surfaces are formed circumferentially to the holes, projecting portions are formed at the inner face in correspondence with the holes and structure wall portions of the holes, and protruding surfaces are formed circumferentially to base portions of the projecting portions. It is generally preferable that thicknesses of the case defined by the recessed surfaces and the protruding surfaces are made substantially equal to thicknesses at locations around the protruding surfaces of the case.

As described above, in the case of a recording tape cartridge that is loaded at a drive device and used, the reel area ribs are provided, and the reel area ribs define the reel area accommodating the reel on which the recording tape is wound.

The reference surfaces are recessedly formed in the outer face of the case, at positions that correspond to the region at an outer side of the reel area ribs, that is, obverse to the region, and serve as references for positioning in the height direction of the case in the drive device. At the inner side of the reel area ribs, the annular protruding surface, that is, a protruding portion, is provided in the reel area. Portions other than the reel area ribs that are thinner because of the reference surfaces are made thicker at the inner face side by thickening portions.

Thus, because the annular protruding portion is protrudingly provided at the inner side of the reel area ribs, rigidity of the case can be improved. Moreover, because the portions that would be thinner because of the reference surfaces are made thicker by the annular protruding portion and the thickening portions, differences in thickness with respect to positions surrounding the reference surfaces, that is, the differences in thickness between positions at the reference surfaces and positions surrounding the reference surfaces, can be made smaller, and variations in pressure during molding can be made smaller. Consequently, sinking after forming and/or flow lines and the like are less likely to occur at the peripheries of the reference surfaces. Further, mold transference for higher precision with regard to brightness and/or texture can be provided.

Furthermore, because the annular protruding portion is protrudingly provided at the inner side of the reel area ribs, resin circulates more easily when the reel area ribs are formed. That is, propagation becomes easier. Thus, short shot of the reel area ribs is less likely to occur. Furthermore, because the annular protruding portion is provided in the reel area, if the reel is inclined when the reel tape cartridge is not in use or the like, then the annular protruding portion will abut against outer edge portions of the reel. Accordingly, tilting of the reel can be restrained.

BRIEF DESCRIPTION OF THE DRAWINGS

FIG. 2 is a view showing a sectional view along the lines 2—2 in FIG. 1 and positioning pins of a drive device.

FIG. 3 is a view showing another example of a sectional view along the lines 2—2 in FIG. 1 and the positioning pins of the drive device.

FIG. 4A is a sectional view showing an inclined state of a reel in a situation in which an annular protruding portion is not protrudingly provided in a reel area.

FIG. 4B is a sectional view showing an inclined state of a reel in a situation in which the annular protruding portion is protrudingly provided in the reel area.

DESCRIPTION OF THE PREFERRED EMBODIMENTS

A recording tape cartridge 10 relating to an embodiment of the present invention will be described on the basis of FIGS. 1 to 3. For convenience of explanation, a direction of loading the recording tape cartridge 10 into a drive device (the direction of an arrow A) is taken to be a forward direction, and the direction of an arrow B is taken to be a downward direction. Front, back, left, right, up and down are expressed with reference to a case of viewing in the direction of arrow A.

Figure 1:
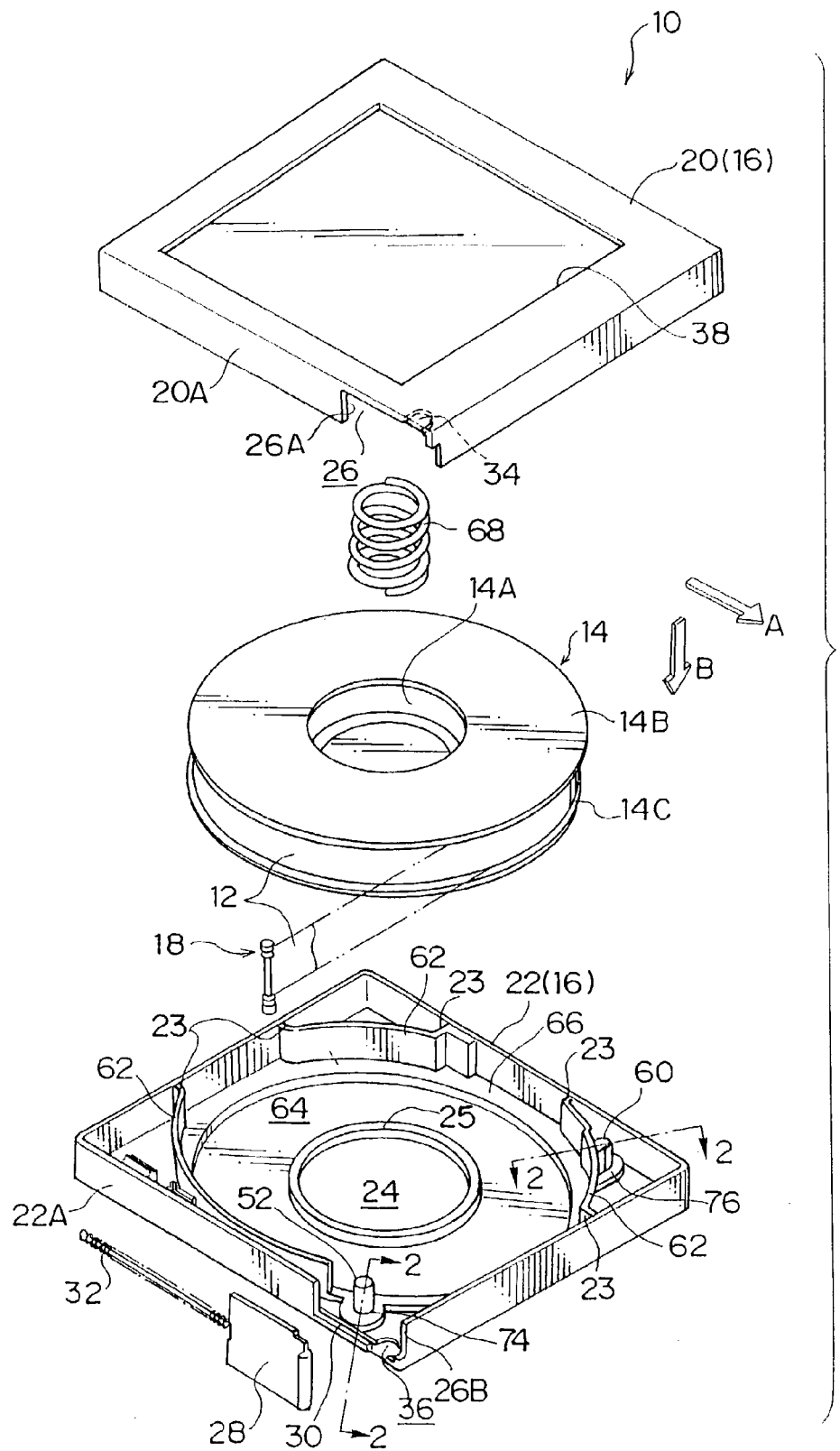
FIG. 1 is an exploded perspective view showing overall structure of a recording tape cartridge relating to an embodiment of the present invention.
Figure 5:
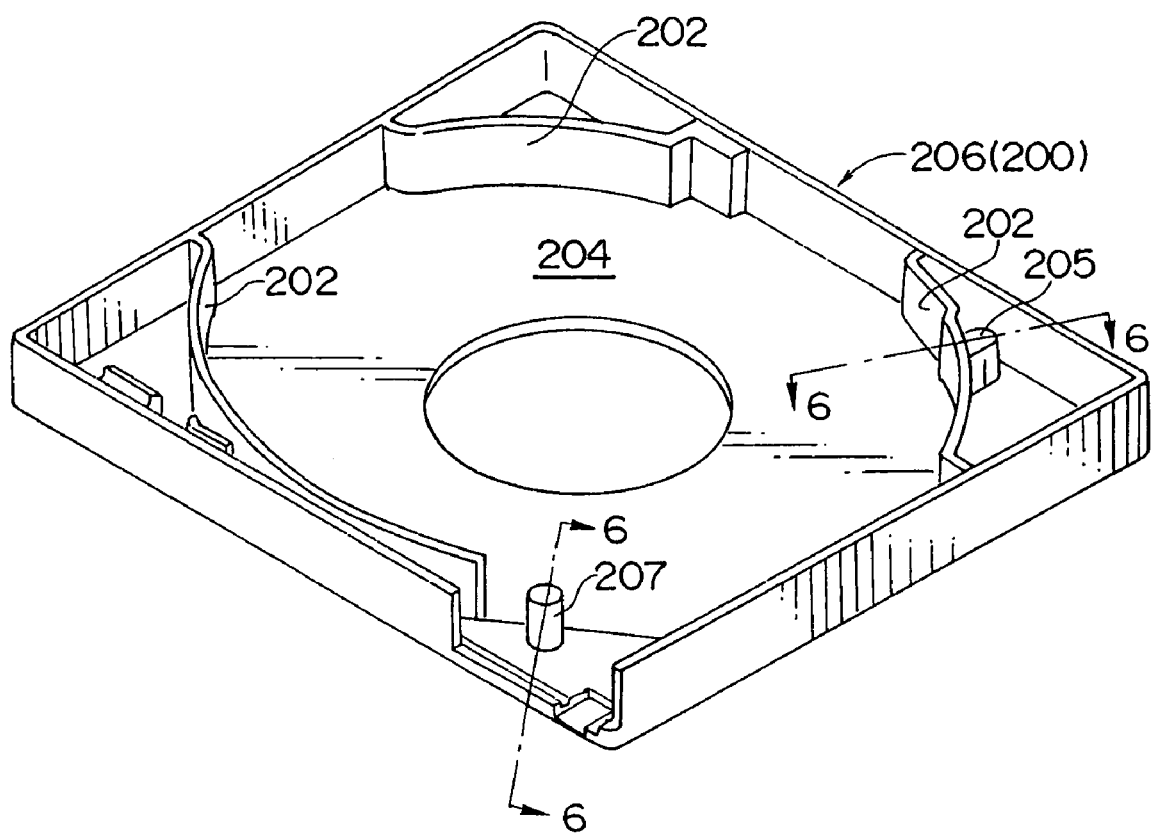
FIG. 5 is a perspective view showing a lower case of a conventional recording tape cartridge.
Figure 6:
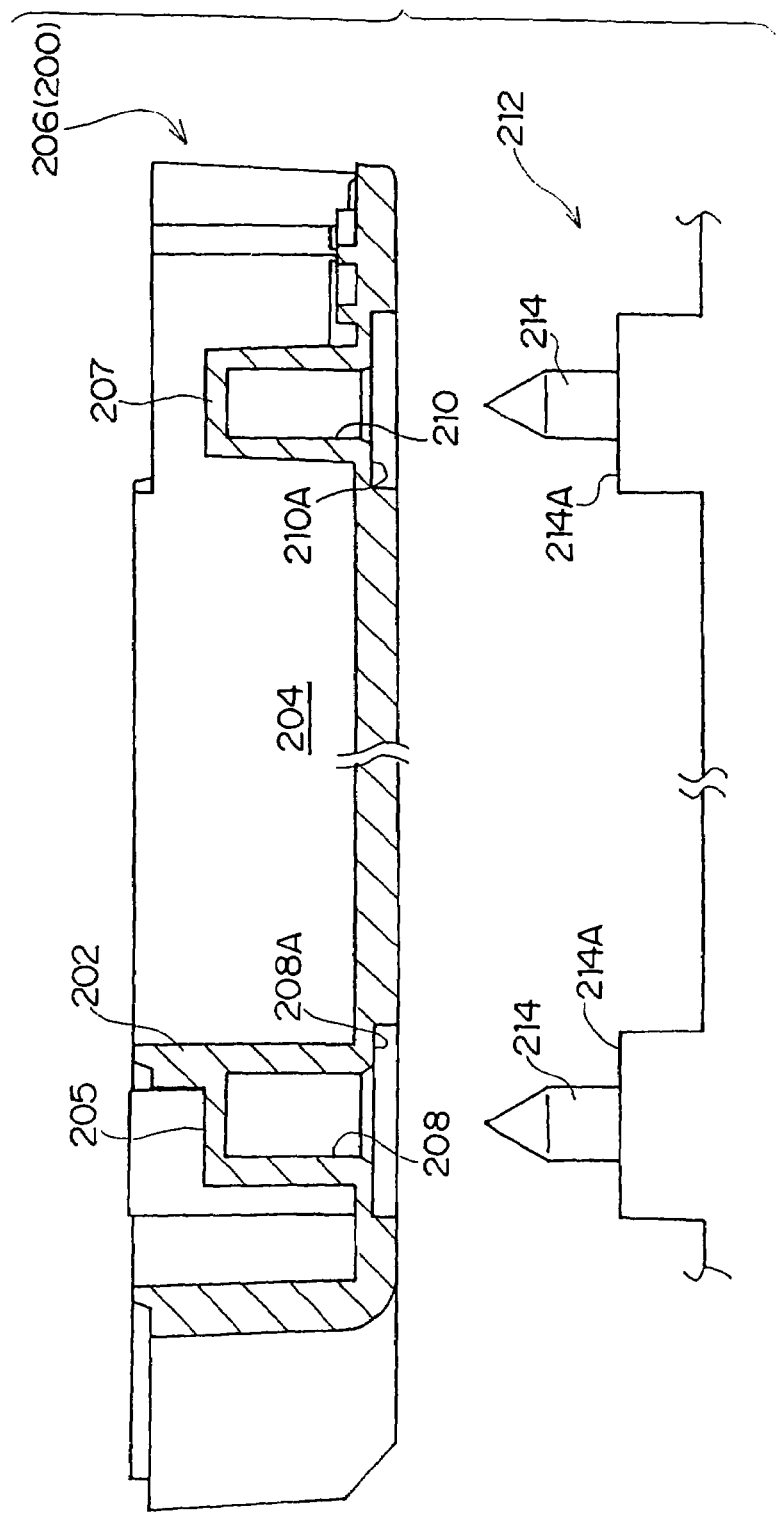
FIG. 6 is a view showing a sectional view along the lines 6—6 in FIG. 5 and the positioning pins of the drive device.

As shown in FIG. 1, the recording tape cartridge 10 is structured to rotatably accommodate a single reel 14 in a case 16. A magnetic tape 12, which serves as a recording tape which is an information recording/replaying medium, is wound on the reel 14. The case 16 is substantially rectangular in plan view.

At the reel 14, an upper flange 14B and a lower flange 14C are coaxially provided at respective upper and lower ends of a substantially cylindrical reel hub 14A. The reel 14 is formed such that the reel hub 14A, the upper flange 14B and the lower flange 14C are integrally rotatable. The magnetic tape 12 is wound around at an outer peripheral portion of the reel hub 14A. A leader pin 18 is attached at a free end of the magnetic tape 12, in a state in which both of end portions of the leader pin 18 protrude outward from width direction end portions of the magnetic tape 12.

The case 16 is formed in a substantially rectangular box shape by joining an upper case 20 and a lower case 22, which are respectively formed of synthetic resin. A label area 38, which is substantially rectangular in plan view, is recessedly provided at an upper face of the upper case 20.

A gear aperture portion 24 is formed at a substantially central portion of the lower case 22. A reel rib 25 is standingly provided at an edge portion of the gear aperture portion 24. The reel 14 is positioned by this reel rib 25.

A spring 68 is disposed in the case 16. The spring 68 urges the reel 14 downward. As a result, an unillustrated reel gear provided downward of the reel 14 is exposed through the gear aperture portion 24. An unillustrated gear meshes with the reel gear, and transmits rotary force to the reel 14. Thus, the reel 14 is driven to rotate in the case 16.

Reel area ribs 62, which are respectively circular arc-shaped, are standingly provided at inner faces of the upper case 20 and the lower case 22. (In this respect, the upper case 20 is substantially the same as the lower case 22, and thus illustration thereof is omitted.)

The reel area ribs 62 are formed such that a radius of curvature thereof is slightly greater than an external radius of the upper flange 14B and the lower flange 14C of the reel 14. Thus, the reel area ribs 62 demarcate a reel area 64 which rotatably accommodates the reel 14.

Further, a plurality of ribs 23 is provided between the reel area ribs 62 and peripheral walls of the upper case 20 and the lower case 22. The ribs 23 connect the reel area ribs 62 with the respective outer walls, and reinforce the reel area ribs 62 and the outer walls.

An annular protruding portion 66 (which is described later) is provided at the lower case 22, at the reel area ribs 62 side of the reel area 64. The annular protruding portion 66 forms a substantially rectangular shape in cross-section, and has a height substantially the same as the reel rib 25.

Substantially rectangular opening portions 26A and 26B are formed in a right side wall 20A of the upper case 20 and a right side wall 22A of the lower case 22. An opening portion 26, which is structured by the opening portion 26A and the opening portion 26B, is for drawing out the magnetic tape 12 from the case 16. The opening portion 26 is opened and closed by a sliding door 28.

A pair of upper and lower rail grooves 30 are provided in the case 16 along the opening portion 26 (the rail groove in the upper case 20 is not shown). Specifically, in a state in which upper and lower end portions of the sliding door 28 are inserted into the rail grooves 30, the sliding door 28 is structured to slide in the rail grooves 30, to open and close the opening portion 26. The sliding door 28 is urged forward by a coil spring 32, so as to normally close up the opening portion 26.

Inward of the opening portion 26, retaining channels 34 and 36 are provided in the upper case 20 and the lower case 22, respectively. The upper and lower end portions of the leader pin 18 are inserted into the retaining channels 34 and 36, and the leader pin 18 is retained at the retaining channels 34 and 36 by an unillustrated leaf spring or the like.

The retaining channels 34 and 36 are formed so as to communicate with the rail grooves 30. Side portions of the retaining channels 34 and 36 at vicinities thereof near the opening portion 26 are cut away so as to form portions of the rail grooves 30.

At an unillustrated library device which accommodates the recording tape cartridge 10, a plurality of holders is provided. The recording tape cartridges 10 are loaded in the respective holders. When information is to be recorded/replayed, a desired one of the recording tape cartridges 10 is taken out by a robot hand or the like and loaded at one of drive devices (not shown).

The recording tape cartridge 10 that has been loaded at the drive device is positioned in the drive device. In a state in which the recording tape cartridge 10 has been positioned thus, the magnetic tape 12 is drawn out from the case 16, and information is recorded to the magnetic tape 12 and/or information that has been recorded at the magnetic tape 12 is replayed.

As shown in FIG. 2 (note that the upper case 20 is not shown in this drawing), a first reference hole 50 and a second reference hole 58 are provided at a region of outer face of the lower case 22 which is obverse to (corresponds to) a region of the inner face that is located at an outer side of the reel area ribs 62. In accordance with the first reference hole 50, a boss 52 projects from the inner face of the lower case 22. In accordance with the second reference hole 58, a boss 60 projects from the inner face of the lower case 22 (refer to and compare with FIG. 1). Circular arc-shaped thickening portions 74 and 76 (which are described later) are protrudingly provided at base portions of the boss 52 and the boss 60.

The first reference hole 50 and the second reference hole 58 are fittable by insertion from outside of positioning pins 70 and 72, which are disposed in the drive device, respectively. Thus, the first reference hole 50 and the second reference hole 58 serve as positioning references in horizontal directions (the front-rear direction and the left-right direction) of the recording tape cartridge 10 (see FIG. 1).

Here, although the second reference hole 58 serves together with the first reference hole 50 as a positioning reference in the horizontal directions of the recording tape cartridge 10, the second reference hole 58 is set to be a long hole in the left-right direction of the lower case 22. Thus, an error in a separation distance between the first reference hole 50 and the second reference hole 58 can be tolerated.

A first reference surface 78 and a second reference surface 80 are recessedly provided at opening portions of the first reference hole 50 and the second reference hole 58, respectively. Pedestal seats 70A and 72A are provided at base portions of the positioning pins 70 and 72, respectively. The first reference surface 78 and the second reference surface 80 are abuttable against the pedestal seats 70A and 72A.

Accordingly, when the first reference hole 50 and the second reference hole 58 of the recording tape cartridge 10 are fitted over the drive device side positioning pins 70 and 72, respectively, the first reference surface 78 formed at the first reference hole 50 and the second reference surface 80 formed at the second reference hole 58 abut against the pedestal seats 70A and 72A, respectively. Thus, the recording tape cartridge 10 is positioned in the horizontal directions and in the height direction.

In accordance with the structure described above, when the magnetic tape 12 of the recording tape cartridge 10 shown in FIGS. 1 and 2 is to be used, the recording tape cartridge 10 is loaded along the direction of arrow A into a bucket of an unillustrated drive device. In accordance with this loading, the sliding door 28 is moved relatively in a direction opposite to the direction of arrow A, against urging force of the coil spring 32, and the opening portion 26 is opened.

In accordance with a descent of the bucket, the first reference hole 50 and the second reference hole 58 are fitted over the positioning pin 70 and the positioning pin 72, respectively, of the drive device. Thus, positioning of the case 16 in the horizontal directions (the front-rear direction and the left-right direction) is achieved. Together therewith, the first reference surface 78 and the second reference surface 80 abut against the pedestal seats 70A and 72A of the positioning pins 70 and 72, respectively. Thus, positioning of the case in the height direction is achieved.

In this state, a hook member of the drive device engages with the two end portions of the leader pin 18 attached to the distal end of the magnetic tape 12, which respectively protrude beyond the width direction end portions of the magnetic tape 12. This hook member moves toward a take-up reel side of the drive device, and the two end portions of the leader pin 18 are accordingly taken out from the retaining channels 34 and 36.

Hence, the magnetic tape 12 is drawn out from the case 16 through the opening portion 26, and is guided along a predetermined tape path to the take-up reel by the hook member. In this state, the reel 14 and the take-up reel are driven to rotate contemporaneously. Thus, the magnetic tape 12 is sequentially wound onto the take-up reel while reading of information (data) and/or replaying of information is carried out.

When the magnetic tape 12 has been completely wound up by the take-up reel, the reel 14 and the take-up reel are driven to rotate in reverse, and the magnetic tape 12 is wound back to the reel 14. When the magnetic tape 12 has been completely wound back onto the reel 14, the leader pin 18 is put into the retaining channels 34 and 36 of the case 16, and is retained by the unillustrated leaf spring.

In this state, the bucket ascends, and the positioning pins 70 and 72 are removed from the first reference hole 50 and the second reference hole 58, respectively. When the ascent of the bucket is complete, the recording tape cartridge 10 moves in the direction opposite to the direction of arrow A, the sliding door 28 closes the opening portion 26 due to the urging force of the coil spring 32, and the recording tape cartridge 10 is ejected from the drive device. Thus, the recording tape cartridge 10 returns to its initial state.

Next, the essence of a recording tape cartridge relating to an embodiment of the present invention will be explained.

As shown in FIGS. 1 and 2, the annular protruding portion 66, which forms an annular protruding surface, is protrudingly provided at the reel area ribs 62 side of the reel area 64 provided at the inner face of the lower case 22. Further, the boss 52 and the boss 60 provided at the inner face of the lower case 22 are formed along an outer face of the reel area ribs 62. Base portions of the bosses 52 and 60 are supported by parts of the annular protruding portion 66, that is, the parts of the annular protruding portion 66 are formed to be extended beyond the reel area ribs 62 in certain places (i.e., the base portions of the bosses 52 and 60 are respectively located at such extended parts of the annular protruding portion 66, that is, on the protruding surface).

Accordingly, the thickening portions 74 and 76, which are substantially the same height as the annular protruding portion 66, are provided at the boss 52 and the boss 60, respectively. Thicknesses at the first reference surface 78 and the second reference surface 80 are set to be substantially equal.

Here, because the first reference surface 78 and the second reference surface 80 are recessedly provided at the region of the outer face of the lower case 22 that corresponds to the region at the outer side of the reel area ribs 62 formed on the inner face, thicknesses thereat would be made thinner in a situation in which the thickening portion 74, the thickening portion 76 and the annular protruding portion 66 were not provided. However, because the thickening portion 74, the thickening portion 76 and the annular protruding portion 66 are provided at the base portions of the bosses 52 and 60, the thicknesses of the first reference surface 78 and the second reference surface 80 can be made thicker, and differences in thickness with respect to positions surrounding (peripheries of) the first reference surface 78 and the second reference surface 80, that is, differences in thickness between positions at the first and the second reference surfaces 78, 80 and positions surrounding the first and the second reference surfaces 78, 80 can be made smaller.

As a result, pressure variations at a time of forming can be made smaller, and post-formation sinking and/or flow lines and the like are less likely to occur around the first reference surface 78 and the second reference surface 80. Moreover, high accuracy mold transcription for brightness and/or texturing can be obtained.

Further, because the annular protruding portion 66 is protrudingly provided at the inner side of the reel area ribs 62, resin can circulate more easily during formation of the reel area ribs 62, and short shot of the reel area ribs 62 is less likely to occur.

In addition, because the annular protruding portion 66 is protrudingly provided in the reel area 64, stiffness of the lower case 22 can be increased. Thus, even if plate thickness in the reel area 64 is made the same as plate thickness of portions other than the reel area 64, stiffness of the lower case 22 can be made sufficient in response to pressing force of the spring 68 disposed in the case 16.

Further again, when the recording tape cartridge 10 is not in use or the like, the reel 14 may become inclined in the recording tape cartridge 10. At such a time, in a situation in which the annular protruding portion 66 is not provided in the reel area 64, as shown in FIG. 4A, the reel 14 may be tilted to such an extent that the upper flange 14B abuts against the inner face of the upper case 20 (an inclination of the reel 14 in this case is $\theta_1$). However, because the annular protruding portion 66 whose internal diameter is smaller than the diameter of the lower flange 14C is provided at the side of the reel area ribs 62, as shown in FIG. 4B, an outer edge portion of the lower flange 14C abuts against the annular protruding portion 66, and tilting of the reel 14 is limited. Therefore, inclination of the reel 14 can be restrained (if an inclination of the reel 14 in this case is $\theta$, then $\theta<\theta_1$).

The annular protruding portion 66, which is protrudingly provided at the reel area ribs 62 side of the reel area 64, has a substantially rectangular cross-sectional form. However, it is sufficient that pressure variations between the first reference surface 78 and second reference surface 80 and the surroundings of the first reference surface 78 and second reference surface 80 can be made smaller at the time of formation. Therefore, the cross-sectional form of the annular protruding portion is not limited thus.

For example, as shown in FIG. 3, substantially truncated cone-shaped thickening portions 90A and 92A may be provided at base portions of bosses 90 and 92 in correspondence with a first reference surface 86 and a second reference surface 88, respectively, and a sloping portion 98, whose thickness gradually increases toward a base portion of a reel area rib 96, may be provided in a reel area 94.

As shown in FIG. 1, the present embodiment has a structure which is provided with the leader pin 18, which is held by the drive device side when the magnetic tape 12 is drawn out from the case 16. However, the present invention is not limited thus. Obviously, the present invention can be applied to any recording tape cartridge provided with a member that can be held instead of the leader pin 18. Thus, for example, the structure of the recording tape cartridge 10 may be provided with a leader block or a leader tape instead of the leader pin 18.

Further, in the present embodiment, an example in which the present invention is applied to the recording tape cartridge 10, which rotatably accommodates the single reel 14 in the case 16, has been illustrated. However, the present invention is not limited thus. For example, the present invention may be applied to a recording tape cartridge equipped with two reels for video use or the like.

Further again, in this structure the magnetic tape 12 is used as the recording tape, but the present invention is not limited thus. It is sufficient if the recording tape is understood to be a long tape-like information recording/replaying medium which is capable of recording information and replaying information that has been recorded. The recording tape cartridge relating to the present invention can be applied to recording tape of any recording/replaying system.

Because the present invention has the structure described above, rigidity of a case can be improved by protrudingly providing an annular protruding portion at an inner side of a reel area rib. Thickness differences between reference surfaces and reference surface peripheries can be made smaller by thickening, with the annular protruding portion and thickening portions, portions that would be thinner because of the reference surfaces. Thus, pressure variations during forming can be made smaller. Therefore, sinking after formation and/or flow lines and the like are less likely to occur at the reference surface peripheries, and/or high precision mold transcription for brightness and/or texturing can be obtained.

Because the annular protruding portion is protrudingly provided at the inner side of the reel area rib, resin can circulate more easily (propagation is easier) when the reel area rib is formed, and short shot of the reel area rib is less likely to occur. Moreover, because the annular protruding portion is provided at the inner side of the reel area rib, if the reel is tilted when the recording tape cartridge is not in use or the like, then an outer edge portion of the reel abuts against the annular protruding portion. As a result, tilting of the reel can be suppressed.

What is claimed is:

1. A recording tape cartridge which accommodates a recording tape and is loaded at a drive device for use, the recording tape cartridge comprising:
   a reel at which the recording tape is wound; and
   a case which includes an inner face on which the reel is disposed, the case accommodating the reel,
   wherein the case includes:
   a rib which protrudes on the inner face and bounds a region accommodating the reel, and
   an annular protruding surface protruding from the inner face, which surface is located at an inner side of and in direct contact with the rib.

2. The recording tape cartridge of claim 1, wherein the case includes an outer face which is obverse to the inner face, a recessed surface is formed at the outer face, and the recessed surface includes a reference surface for a height direction of the recording tape cartridge.

3. The recording tape cartridge of claim 2, further comprising another protruding surface, which is formed at the inner face in correspondence with a region which includes at least the recessed surface.

4. The recording tape cartridge of claim 3, wherein the annular protruding surface and the another protruding surface comprise surfaces which are substantially the same height.

5. The recording tape cartridge of claim 3, wherein a thickness of the case that is defined by the recessed surface and any protruding surface of the annular protruding surface and the another protruding surface is substantially the same as a thickness of the case at a region peripheral to the any protruding surface.

6. The recording tape cartridge of claim 1, wherein an outer face which is obverse to the inner face includes a hole for positioning.

7. The recording tape cartridge of claim 6, wherein the hole is formed in the outer face in correspondence with a region at an outer side of the rib.

8. The recording tape cartridge of claim 6, wherein a recessed surface is formed at a circumference of the hole, and the recessed surface includes a reference surface for a height direction of the recording tape cartridge.

9. The recording tape cartridge of claim 6, further comprising a projecting portion formed at the inner face in correspondence with the hole, the projecting portion forming a wall portion of the hole.

10. The recording tape cartridge of claim 9, further comprising another protruding surface, which is formed at a circumference of a base portion of the projecting portion.

11. The recording tape cartridge of claim 10, wherein the annular protruding surface and the another protruding surface comprise surfaces which are substantially the same height.

12. The recording tape cartridge of claim 10, wherein a thickness of the case that is defined by the recessed surface and any protruding surface of the annular protruding surface and the another protruding surface is substantially the same as a thickness of the case at a region peripheral to the any protruding surface.

13. The recording tape cartridge of claim 1, wherein the case comprises an upper case and a lower case which are formed of resin, the upper case and the lower case being joined and accommodating the reel thereinside.

14. The recording tape cartridge of claim 13, wherein the lower case includes the inner face.

15. A recording tape cartridge which accommodates a recording tape and is loaded at a drive device for use, the recording tape cartridge comprising:
a reel at which the recording tape is wound; and
a case which includes an inner face on which the reel is disposed, the case accommodating the reel,
wherein the case includes:
a rib which protrudes on the inner face and bounds a region accommodating the reel,
an annular protruding surface formed on the inner face, which surface is adjacent to and located at an inner side of the rib,
an outer face which is obverse to the inner face, a recessed surface is formed at the outer face, and the recessed surface includes a reference surface for a height direction of the recording tape cartridge, and
another protruding surface, which is formed at the inner face in correspondence with a region which includes at least the recessed surface,
wherein the annular protruding surface and the another protruding surface comprise surfaces which are inclined downward from a rib side thereof.

16. A recording tape cartridge which accommodates a recording tape and is loaded at a drive device for use, the recording tape cartridge comprising:
a reel at which the recording tape is wound; and
a case which includes an inner face on which the reel is disposed, the case accommodating the reel,
wherein the case includes:
a rib which protrudes on the inner face and bounds a region accommodating the reel, and
an annular protruding surface formed on the inner face, which surface is adjacent to and located at an inner side of the rib,
an outer face which is obverse to the inner face and includes a hole for positioning,
a projecting portion formed at the inner face in correspondence with the hole, the projecting portion forming a wall portion of the hole, and
another protruding surface, which is formed at a circumference of a base portion of the projecting portion,
wherein the annular protruding surface and the another protruding surface comprise surfaces which are inclined downward from a rib side thereof.

17. A recording tape cartridge which accommodates a recording tape and is loaded at a drive device for use, the recording tape cartridge comprising:
a reel at which the recording tape is wound; and
a case which includes an inner face on which the reel is disposed, the case accommodating the reel,
wherein the case includes:
a rib which protrudes on the inner face and bounds a region accommodating the reel,
an outer face obverse to the inner face;
a recessed surface at the outer face for providing a reference surface for a height direction of the recording tape cartridge; and
a protruding surface formed at the inner face for a region corresponding to at least the recessed surface, said protruding surface comprising a surface that inclines downward from the rib.

18. The recording tape cartridge of claim 17, wherein a hole for positioning is formed in the outer face in correspondence with a region at an outer side of the rib.

19. The recording tape cartridge of claim 18, wherein the recessed surface is formed at a circumference of the hole, a projecting portion is formed at the inner face in correspondence with the hole, the projecting portion structures a wall portion of the hole, and the protruding surface is formed at a circumference of a base portion of the projecting portion.

20. The recording tape cartridge of claim 17, wherein a thickness of the case that is defined by the recessed surface and the protruding surface is substantially the same as a thickness of the case at a region peripheral to the protruding surface.

* * * * *